July 20, 1943.  M. W. PATTON  2,324,801
POLLINATION OF TREES
Filed July 6, 1942   2 Sheets-Sheet 1

MATTHEW W. PATTON
INVENTOR

BY Geisler and Geisler
ATTORNEYS

July 20, 1943.  M. W. PATTON  2,324,801
POLLINATION OF TREES
Filed July 6, 1942  2 Sheets-Sheet 2

MATTHEW W. PATTON
INVENTOR

BY Geisler and Geisler
ATTORNEYS

Patented July 20, 1943

2,324,801

UNITED STATES PATENT OFFICE 2,324,801

POLLINATION OF TREES

Matthew W. Patton, Portland, Oreg.

Application July 6, 1942, Serial No. 449,909

5 Claims. (Cl. 47—1)

This invention relates in general to pollinating or distributing pollen among trees, and especially to the distributing of pollen on the blossoms of nut trees.

In particular, this invention is concerned with improved pollination of such nut trees as filberts on which both "catkins" and blossoms are formed. As is well known, the pollen is produced in the "catkins" and when this pollen drops on to the blossoms it serves to fertilize the blossoms. Only those blossoms which are fertilized by pollen produce the best nuts. If a blossom on the tree receives no pollen, then either no nut at all will develop or else the nut will be small, undeveloped, or "blank."

In nut culture it has been found that some species of nut trees produce more of the pollen-bearing "catkins" than others and thus it has been customary, in planting such nut orchards, to place trees of the species producing "catkins" more abundantly at intervals among trees of other species in order to insure better pollinating of the latter. While this results in considerable improvement in nut crop production, there is still considerable room for further improvement in more efficient pollinating of the trees.

The blossoms on the filbert nut trees and the pollen producing "catkins" appear in early spring. The time varies somewhat with different species of trees. When the pollen on the "catkins" is ripe it lasts only a couple of weeks and if, during that period, it is not distributed on the blossoms its value is entirely lost. The distribution of pollen under normal conditions is brought about by gentle breezes which carry or lift the pollen from the "catkins" and cause it to drop toward the ground during which some of it will settle on the blossoms. This distribution cannot take place during rainy weather, but it may be accomplished during short intervals between showers, provided other conditions are favorable. It seldom happens that rain falls continually during the entire period during which the pollen is ripe. It does sometimes happen, however, that no distributing breeze prevails during the periods between showers, or that the breeze is in the wrong direction for the particular orchard which may be cut off from such breeze by a hill. In such case orchard men not infrequently go through the orchards and shake the trees in order to loosen the pollen from the "catkins" and cause some of it to drop on the blossoms. This manual shaking of individual trees requires considerable time and effort and is only partially effective, particularly if the trees are of good size.

After considerable experience with these conditions it occurred to me that these difficulties could be considerably alleviated and crop production considerably increased if an artificial breeze could be created among the trees at just the proper moment. Thereupon I proceeded to experiment with artificial breeze in our orchard but found that just any artificial air currents would not be entirely satisfactory but that such air currents, in order to produce the best results, must simulate the most favorable pollen distributing breezes.

The object of this invention accordingly is to increase crop production from nut trees and the like by promoting pollination through artificial means in a manner simulating as closely as possible the method employed by nature under most favorable conditions.

A further object of this invention is to provide simple and practical means for carrying out such pollination and, in brief, for producing artificial breezes or air currents which will resemble most favorably a pollen distributing breeze.

The method which I have developed as the result of considerable experimenting and which has been proven to be very satisfactory, and the simple device which I have employed for carrying out my object are hereinafter briefly described. In the description reference is made to the accompanying drawings in which.

Figure 1:
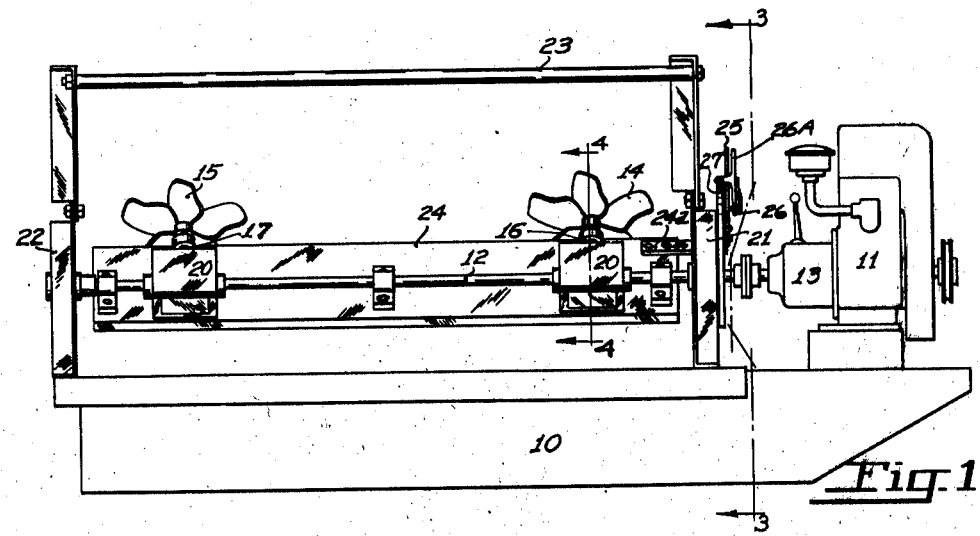
Figure 1 is a side elevation of an apparatus used in carrying out my invention.
Figure 2:
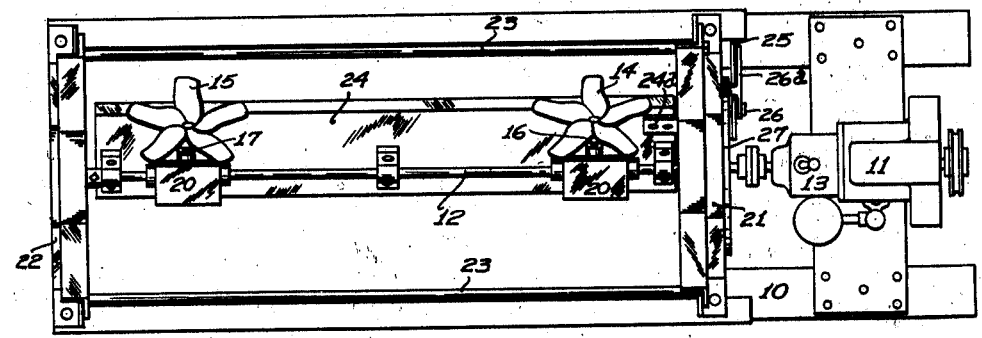
Figure 2 is a plan view of the same apparatus.
Figure 3:
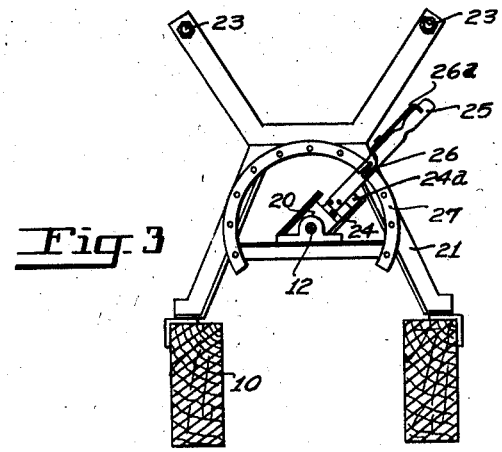
Figure 3 is a sectional end view corresponding to line 3—3 of Figure 1.
Figure 4:
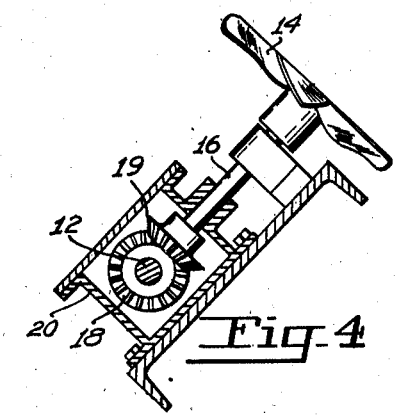
Figure 4 is a section corresponding to the lines 4—4 of Figure 1.

Referring first to Figures 1, 2 and 3, the artificial breeze-creating means is shown mounted on a sled 10 which sled is adapted to be drawn behind a farm tractor or other suitable vehicle. A motor 11, located at the front end of the sled 10, is connected to a horizontal, longitudinally extending shaft 12 through a conventional clutch mechanism 13. A pair of fans 14 and 15 are carried on the ends of shafts 16 and 17 respectively, these fan shafts being parallel to each other and perpendicular to the horizontal shaft 12. The fan shafts are driven from the horizontal shaft 12 through the medium of gears 18 and 19 located in the housings 20, 20. The horizontal shaft 12 is journaled in end frame members 21, 22 which are secured to the sled frame at the bottom and which are joined together at the top by tie rods 23. A longitudinally extending fan-supporting member 24 is journaled on the shaft 12 and supported in the end frame members 21, 22 and mounted for independent rotation with the shaft 22 as the axis. The support member 24 supports the gear housings 20, 20 and also carries suitable journals and bearings for the fan shafts 16 and 17. A positioning lever 25 is attached to the forward end of the member 24 by any suitable means such as a bracket 24A and is provided with manually operable locking means comprising a pin 26 and lever 26A adapted to cooperate with a semi-circular track 27 to hold the lever 25, and therewith the member 24 and the fan shafts 16 and 17, at any desired inclination to the horizontal. Thus the angle of inclination of the fans 12 and 15 may be changed by manipulation of the lever 25.

The fans 14 and 15 are preferably of the "high center type," that is to say, a considerable portion of the "trailing" edge of each blade of the fan lies substantially in a plane passing through the end of the fan hub and perpendicular to the axis, while the "leading" edge of each blade is below such plane and, for the most part, extends obliquely to it. This causes more air to be driven from the outer ends of the blades than from their inner ends adjacent the hub and the broader outer ends of the blades drive the air upwardly and outwardly and thus produce a current of air which is conical or funnel shaped. As far as possible, the fans should be such size and spaced such a distance apart that the air currents which they create will come together below the lowest branches from which the "catkins" are hanging. The effect of the two air currents from the fans will then be that of a single upwardly directed breeze the duration of which will depend upon the speed with which the sled is pulled over the ground. As an example, I have found it satisfactory, in an orchard with average size trees, to use 15-inch fans spaced with their centers from 4 to 5½ feet apart and to pull the sled along between the rows of trees at a speed of approximately 5 miles per hour.

The fans could be made larger and the distance between the fans could be increased, for the purpose of having the apparatus moved at faster speed past the trees, and it would also be feasible to have three or more fans in spaced tandem arrangement in order to produce a more elongated combined air current and thus permit the apparatus to be moved even faster and still provide a breeze of sufficient duration at each point to carry out my method. However, I consider the use of two fans with the arrangement as previously described to be the most practical.

The speed of the fans, or the strength of the air currents, and the angle at which the same are directed, should depend particularly upon the distance at which the apparatus is spaced from the trunks of the trees as it moves along and also on the size of the trees. For example, if the apparatus passes close to the trunks of the trees the fans must be aimed at a greater angle of elevation than would be the case when the apparatus is spaced considerable distance from the trunks. It must also be borne in mind that the object of the artificial breeze is not to blow the pollen on to the blossoms but to dislodge the pollen from the "catkins," hold it in suspension in the air for a moment, and then allow the pollen to settle gradually on to the blossoms while dropping downwardly. I have observed that heavy winds may interfere with proper pollination due to the fact that most of the pollen is blown past the blossoms, and similarly, for this reason, attempts to promote pollination by artificial air currents which are too strong have not proven successful but merely resulted in blowing large quantities of pollen from the trees to settle at more or less remote points on the ground.

When employing my method one must also take into account the prevailing wind conditions. Thus there may be a slight prevailing breeze in part of the orchard suitable for distributing pollen but this breeze may entirely miss another part of the orchard which may be located closer to the side of a hill acting as a wind break. Or, as frequently happens with orchards located in hilly country or adjacent heavily wooded areas, the prevailing breeze may touch only the tops of some or all the trees or will pass entirely over the tops of these. Also the breeze, although touching the trees, may be insufficient to lift the pollen from the "catkins." All these difficulties can be successfully met through my invention. For example, assuming that there is a gentle breeze touching the tops of the trees only and that special pollen-bearing trees have been planted at intervals among the others, an artificial air current directed at a high angle, with the apparatus which I have described, from beneath the trees will dislodge and lift the pollen until some of it is caught by the upper breeze and spread as it gradually settles. With fruit trees, as distinguished from nut trees, since there are no special pollen-bearing trees, there is no advantage in spreading pollen from one tree to another, and best results are obtained merely by lifting the pollen and allowing it to drop downwardly without having it drift to adjoining trees. In all the varying factors and conditions requiring modifications in the direction and intensity of the artificial air current the operator must be guided by judgment and experience. However, brief observation will enable the operator to know in each case whether the method is being properly carried out. Particularly in the case of nut trees having pollen-bearing "catkins" the dislodged pollen can be seen in the air and its course observed. Attention is again called to the fact that the artificial air current is to be controlled and directed so as to produce the same effect as the best pollen-distributing breeze for the particular trees in question and that, in general, the pollen should reach the blossoms by being allowed to drop or settle on them. By bearing these facts in mind and experimenting extensively with my invention particularly with filbert nut trees, I have been so successful, regardless of conditions, that I have attained an average of 4 and 5 nuts in a cluster and with very few blossoms failing to receive the desired pollination—a highly successful result in filbert culture.

While I have shown the apparatus in the Figures 1 to 4 inclusive as mounted upon a sled, this apparatus might be mounted on any suitable vehicle, for instance, might be mounted at the rear of an ordinary truck. Mounting the apparatus on a sled offers certain advantages, one of these being the fact that the apparatus will then be located close to the ground and this is more desirable for smaller trees. It will be found that the artificial breeze generally should start fairly close to the ground. But if the trees are large and the bottommost branches on which the "catkins" are found are considerable distance from the ground, it is not necessary to have the apparatus operate so close to the ground.

Figure 5:
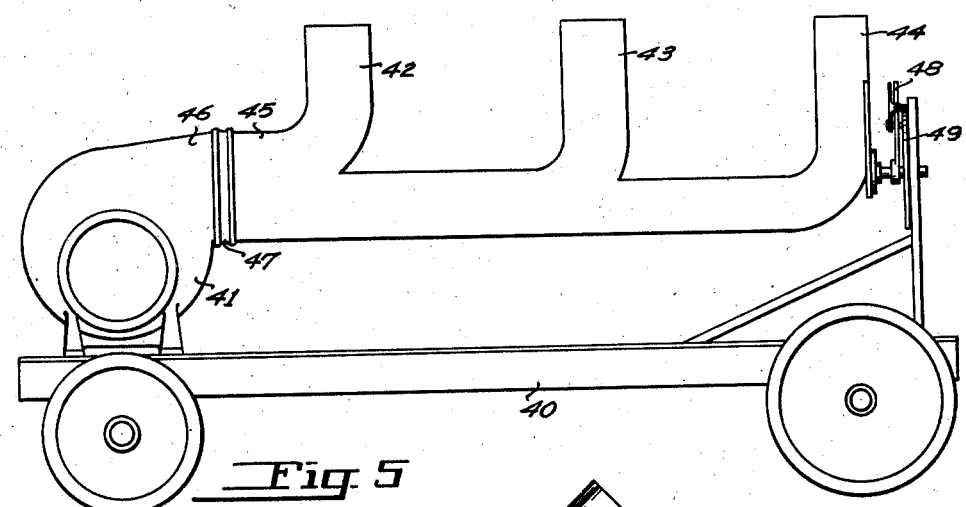
Figure 5 is a more or less diagrammatic side elevation of a modified form of device for carrying out my invention.
Figure 6:
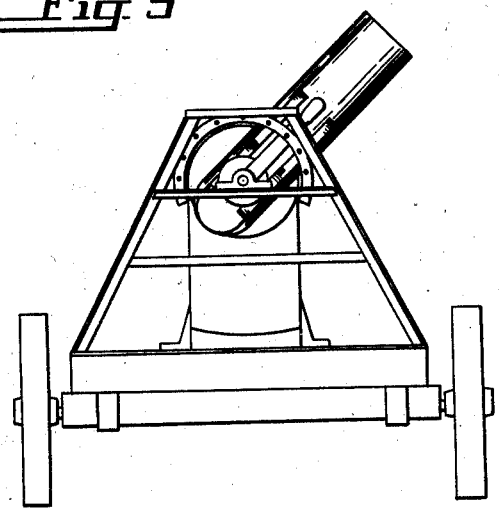
Figure 6 is an end elevation of the same.
Figure 7:
Figure 7 is a diagrammatic view illustrating the artificial pollen-lifting air currents produced in a tree by the apparatus of Figure 1.

In the modified device illustrated in Figures 5 and 6 the apparatus, which is shown mounted on a wheeled vehicle 40, includes a blower 41, assumed to be operated by a suitable motor (not shown), which forces air to be discharged from the outlet pipes 42, 43 and 44. These outlet pipes which are parallel to each other are connected to the main pipe 45 which in turn is connected to the discharge mouth 46 of the blower. The coupling 47 between the mouth 46 of the blower and the main pipe 45 is provided with suitable bearing surfaces and is so arranged as to permit the pipe 45 to be rotated with respect to the blower mouth, the position of the latter being fixed. A positioning lever 48, with locking means similar to that shown in Figures 1, 2 and 3, and adapted to cooperate with a semi-circular track 49, is used for rotating the main pipe 45 and therewith the outlet pipes 42, 43 and 44, and the clamp lever 48 consequently is used for directing the outlet pipes to any desired angle of inclination.

These sizes, dimensions, and spacings are, however, merely suggestions and many variations could of course be made.

Other forms of apparatus as well as modifications of the apparatus which I have illustrated could be used in carrying out my object within the scope of my invention and it is not my intention to limit this invention to the use of any particular apparatus for producing the artificial breeze required for the pollen distribution, nor is it my intention to limit my invention in any manner otherwise than as set forth in the claims.

I claim:

1. The improved apparatus for promoting pollination of fruit trees through an artifically induced air current, said apparatus including a vehicle, a means supported on said vehicle for projecting an air current upwardly through the branches of the trees at an oblique angle from the ground, a second similar means on said vehicle spaced from and in tandem relation with said first means for projecting a second air current similar to and in the same direction as the first mentioned current, the distance between said means on said vehicle being such that the paths of their projected air currents will join in the trees and produce the effect of prolonging the initial air current as the vehicle is moved along the ground, whereby said air currents will act to raise the pollen and hold a substantial percentage of it in suspension in the air for a brief period and then permit it to drop downwardly.

2. The improved apparatus for promoting pollination of fruit trees through an artificially induced air current, said apparatus comprising, a vehicle, a rotary fan supported on said vehicle for projecting an air current upwardly through the branches of the trees at an oblique angle from the ground, a second similar rotary fan on said vehicle spaced from and in tandem relation with said first rotary fan for projecting a second air current similar to and in the same direction as the first mentioned current, the distance between said fans on said vehicle being such that the paths of their projected air currents will join in the trees and produce the effect of prolonging the initial air current as the vehicle is moved along the ground, whereby said air currents will act to raise the pollen and hold a substantial percentage of it in suspension in the air for a brief period and then permit it to drop downwardly.

3. The combination described in claim 1 and an adjustable member controlling the direction of said means whereby the angle of inclination of said means may be varied to suit different conditions and locations of said vehicle with respect to the tree trunks.

4. The improved apparatus for promoting pollination of fruit trees through an artificially induced air current, said apparatus comprising a vehicle, a rotary fan supported on said vehicle for projecting an air current upwardly through the branches of the trees at an oblique angle from the ground, a second similar rotary fan on said vehicle spaced from and in tandem relation with said first rotary fan for projecting a second air current similar to and in the same direction as the first mentioned current, said fans being of the "high center" type, or of the type designed to produce conical or funnel-shaped air currents, the distance between said fans on said vehicle being such that the paths of their projected air currents will join in the trees and produce the effect of prolonging the initial air current as the vehicle is moved along the ground, whereby said air currents will act to raise the pollen and hold a substantial percentage of it in suspension in the air for a brief period and then permit it to drop downwardly, and an adjustable member controlling the direction of said fans whereby the angle of inclination of said fans may be varied to suit different conditions and different locations of said vehicle with respect to the tree trunks.

5. The improved method of artificially promoting pollination of fruit and nut trees, which method comprises lifting the pollen into the air, moving the lifted pollen slightly and gently sidewise, keeping the lifted pollen in suspension in the air for a brief period for better dissemination, and then permitting the pollen to settle and drop in a downward path whereby the blossoms in the path of the settling pollen will be fertilized by the dropping of the pollen upon them.

MATTHEW W. PATTON.